US008885737B2

(12) United States Patent
Kim et al.

(10) Patent No.: US 8,885,737 B2
(45) Date of Patent: Nov. 11, 2014

(54) DECODING APPARATUS AND DECODING METHOD

(75) Inventors: Jae Hyeong Kim, Seoul (KR); Yong Suk Hwang, Yongin-si (KR); Zheng Zi Li, Seongnam-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 945 days.

(21) Appl. No.: 12/162,711

(22) PCT Filed: Feb. 7, 2007

(86) PCT No.: PCT/KR2007/000653
§ 371 (c)(1),
(2), (4) Date: Jul. 30, 2008

(87) PCT Pub. No.: WO2007/091830
PCT Pub. Date: Aug. 16, 2007

(65) Prior Publication Data
US 2009/0052563 A1    Feb. 26, 2009

(30) Foreign Application Priority Data
Feb. 7, 2006    (KR) .................. 10-2006-0011621

(51) Int. Cl.
H04L 27/28    (2006.01)
H04L 1/00    (2006.01)
H04L 27/26    (2006.01)
H04L 1/18    (2006.01)
H04L 25/02    (2006.01)

(52) U.S. Cl.
CPC .......... *H04L 27/2647* (2013.01); *H04L 1/0045* (2013.01); *H04L 1/1812* (2013.01); *H04L 25/023* (2013.01); *H04L 25/022* (2013.01); *H04L 1/0073* (2013.01)
USPC ........... 375/260; 375/130; 375/316; 375/346; 370/343; 370/347; 370/328; 370/349; 455/450; 455/433; 455/452.2; 455/436; 455/445

(58) Field of Classification Search
USPC .......... 375/260, 130, 316, 346, 225; 370/343, 370/347, 328, 349; 455/450, 452.2, 433, 455/436, 445
See application file for complete search history.

(56) References Cited
U.S. PATENT DOCUMENTS
5,870,414 A * 2/1999 Chaib et al. ................... 714/792
6,611,794 B1 * 8/2003 Fleming-Dahl ............... 702/191
(Continued)

FOREIGN PATENT DOCUMENTS
EP          1221793 A2    7/2002
KR    10-2005-0006494 A    1/2005
WO    WO-03/041330 A2    5/2003

OTHER PUBLICATIONS
Proakis, John G. "8-2-2 Optimum Decoding of Convolutional Codes—The Viterbi Algorithm." Digital Communications. 3rd ed. New York: McGraw-Hill, 1995. Print.*
(Continued)

*Primary Examiner* — Shuwang Liu
*Assistant Examiner* — Ross Varndell

(57) ABSTRACT

Provided are a decoding apparatus and method for a system supporting an Orthogonal Frequency Division Multiple Access (OFDMA) scheme, the apparatus and method compensating received signals according to a wireless channel estimation result and thereby simply performing decoding by a coherent method. The decoding method includes the steps of: receiving a Quadrature phase shift keying (QPSK) modulated signal; compensating the received signals by applying a result of channel estimation based on pilot signals to the received signals; performing subcarrier demodulation to generate correlation metrics on the basis of the compensated received signals; and performing decoding using a decoding metric derived from the correlation metrics. The decoding apparatus and method compensate a received wireless signal according to a channel estimation result of a wireless channel through which a signal is transmitted, thereby performing decoding by a coherent method having a simple structure.

15 Claims, 8 Drawing Sheets

(56) References Cited

U.S. PATENT DOCUMENTS 7,639,660 B2 * 12/2009 Kim et al. .................. 370/343
2005/0047515 A1 3/2005 Walton et al.
2007/0025454 A1 * 2/2007 Jones et al. .................. 375/260

OTHER PUBLICATIONS

Proakis, John G.; Section 5-1-1, 5-1-3, and 8-2-2; Digital Communications. 3rd ed. New York: McGraw-Hill, 1995. Print.*

* cited by examiner (a) 
8 data tones
1 pilot tones (b) 
Symbol 0
Symbol 1
Symbol 2

◉ pilot carrier   ◍ data carrier (c) 
Symbol 0
Symbol 1
Symbol 2

◉ pilot carrier   ◍ data carrier

DECODING APPARATUS AND DECODING METHOD

CROSS-REFERENCE TO RELATED APPLICATIONS

The present application is a National Phase of PCT/KR2007/000653, filed Feb. 7, 2007, which claims the benefit of Korean Application No. 10-2006-0011621, filed Feb. 7, 2006, the entire disclosures of which are incorporated by reference herein.

FIELD OF THE INVENTION

The present invention relates to decoding using likelihood in wireless data communication, and more particularly, to a decoding apparatus and method used in wireless portable Internet communication.

BACKGROUND OF THE INVENTION

In wireless data communication, a method is being employed of using likelihood to estimate a correct signal from a signal corrupted by noise. Encoding in the method is a process of symbol-mapping data, i.e., a payload to be transmitted, into a larger number of signals to modulate the data at a transmitting side of a data communication system. And, decoding in the method is a process of estimating a payload having the highest likelihood from the symbol-mapped signals according to an appropriate estimation algorithm at a receiving side of the data communication system. In the encoding process using likelihood, it is preferable for the sake of accurate error correction that data is not just simply symbol-mapped based on its quantity but rather symbol-mapped to large areas of the frequency domain and the time domain. The above-described encoding-decoding method is used for data communication in fields where no data corruption can be tolerated and also is used to transmit a signal requiring a high degree of accuracy, such as a control signal, e.g., an ACK/NACK signal and a feedback signal, in general wireless data communication.

Meanwhile, various techniques of modulating amplitude or a frequency have been suggested as a method of transmitting data on a carrier. Among the techniques, Quadrature phase shift keying (QPSK) modulation changes the phase of a carrier by 90 degrees and transfers 2 bits of information using signs of one period. QPSK modulation enables accurate demodulation. Therefore, QPSK modulation is used in mobile communication equipment such as a digital cellular phone, a car phone, a digital cordless phone, etc., and is also used for a signal transmission scheme of recently provided wireless portable Internet service.

Looking back at the development of wireless data communication systems, cellular mobile telecommunication systems were first introduced in the United States in the late 1970's. This was followed by Korea's advanced mobile phone service (AMPS), an analog mode of the first generation (1G) mobile communication system enabling wireless voice communication. In the mid 1990's, the second generation (2G) mobile communication system was commercialized. This was followed in the late 1990's by commercialization of a part of the International Mobile Telecommunication-2000 (IMT-2000) standard, which has served as the third generation (3G) mobile communication system for providing high-speed wireless multimedia data service.

Nowadays, research is aimed at upgrading the 3G mobile communication system into the fourth generation (4G) mobile communication system. In particular, portable Internet technology is being vigorously researched with the goal of enabling faster data transmission than in a 3G mobile communication system.

The portable Internet satisfies users' demands for high-speed Internet service, anytime, anywhere, via a portable device, and has a ripple effect on the entire information and communication industry in Korea. Therefore, the portable Internet is a new and promising industry, and international standardization of the portable Internet is currently in progress on the basis of Institute of Electrical and Electronics Engineers (IEEE) 802.16e.

FIG. 1 schematically illustrates the structure of a portable Internet service system to which the present invention is applied. The illustrated portable Internet service system comprises portable subscriber stations (PSSs) 12, radio access stations (RASs) 13, access control routers (ACRs) 14, and an AAA (authentication authorization and accounting (AAA)) server 15. The PSSs 12 are used by subscribers to receive portable Internet service. The RASs 13 are located at wire network ends for transmitting and receiving data to and from the PSSs 12 through wireless interfaces. The ACRs 14 are for controlling the RASs 13 and routing Internet protocol (IP) packets. The policy (AAA) server 15 performs authentication, authorization and billing for a subscriber and a PSS 12, and provides service only to legal subscribers connected with the portable Internet network.

The PSSs 12 and the RASs 13 communicate using an Orthogonal Frequency Division Multiple Access (OFDMA) scheme. The OFDMA scheme is a multiplexing method combining a frequency division method (FDM), which uses subcarriers of a plurality of orthogonal frequencies as a plurality of subchannels, with a time division method (TDM). Since the OFDMA scheme is essentially robust against fading generated in a multi-path and has a high data transfer rate, it is possible to obtain optimum transfer efficiency in high-speed data transfer. Thus, the OFDMA scheme fully supports PSS mobility in portable Internet systems.

As described above, in order to ensure accuracy in transmitting and receiving an essential signal like a control signal, e.g., a fast feedback signal and an ACK/NACK signal, a wireless communication system based on the OFDMA scheme, etc. employs a modulation/encoding method whereby a payload is symbol-mapped in a sufficiently wide band channel and transmitted.

However, when a receiving side estimates a payload that has been symbol-mapped in a wireless channel as mentioned above, a received signal's likelihood with respect to a channel signal for all candidate payload values must be calculated, which becomes a heavy burden on the system of the receiving side.

SUMMARY OF THE INVENTION

Technical Problem

The present invention is directed to a decoding apparatus and method capable of simplifying a decoding structure using likelihood.

In further detail, the present invention is directed to a decoding apparatus and method capable of simply performing decoding according to a coherent method by compensating a received signal using a wireless channel estimation result.

Technical Solution

One aspect of the present invention provides a decoding method for a system supporting an Orthogonal Frequency Division Multiple Access (OFDMA) scheme, the method comprising the steps of: receiving Quadrature phase shift keying (QPSK) modulated signals; compensating the received signals by applying a result of channel estimation based on pilot signals to them; performing subcarrier demodulation whereby correlation metrics are generated on the basis of the compensated received signals; and performing decoding using a decoding metric derived from the correlation metrics.

Another aspect of the present invention provides a decoding apparatus for a system supporting an OFDMA scheme, the decoding apparatus comprising: a wireless channel estimating/compensating means for compensating received signals, to which QPSK modulation is applied, according to a channel estimation result based on pilot signals; a correlation metric generating means for generating correlation metrics on the basis of the compensated received signals; and a decoding processing means for performing decoding using a decoding metric derived from the correlation metrics. The apparatus for decoding may further comprise a receiving buffer for buffering the compensated received signals.

One characteristic of the present invention is to perform decoding using only the real part or an absolute value of a received phase signal. In a complex number represented by $a+bi$, the real part is $a$, and the absolute value is $(a^2+b^2)^{1/2}$. The real part or the absolute value of a phase signal can be used for decoding. Hereinafter, the real part and absolute value are collectively referred to as a real value.

Advantageous Effects

The inventive decoding apparatus and method compensate a received wireless signal according to a channel estimation result of a wireless channel through which signals are transmitted, thereby performing decoding by a coherent method having a simple decoding structure.

Consequently, the present invention simplifies the structure of a decoding apparatus and lightens the burden on hardware of a radio access station (RAS) equipped with the decoding apparatus.

DESCRIPTION OF MAJOR SYMBOLS IN THE ABOVE FIGURES

Figure 1:
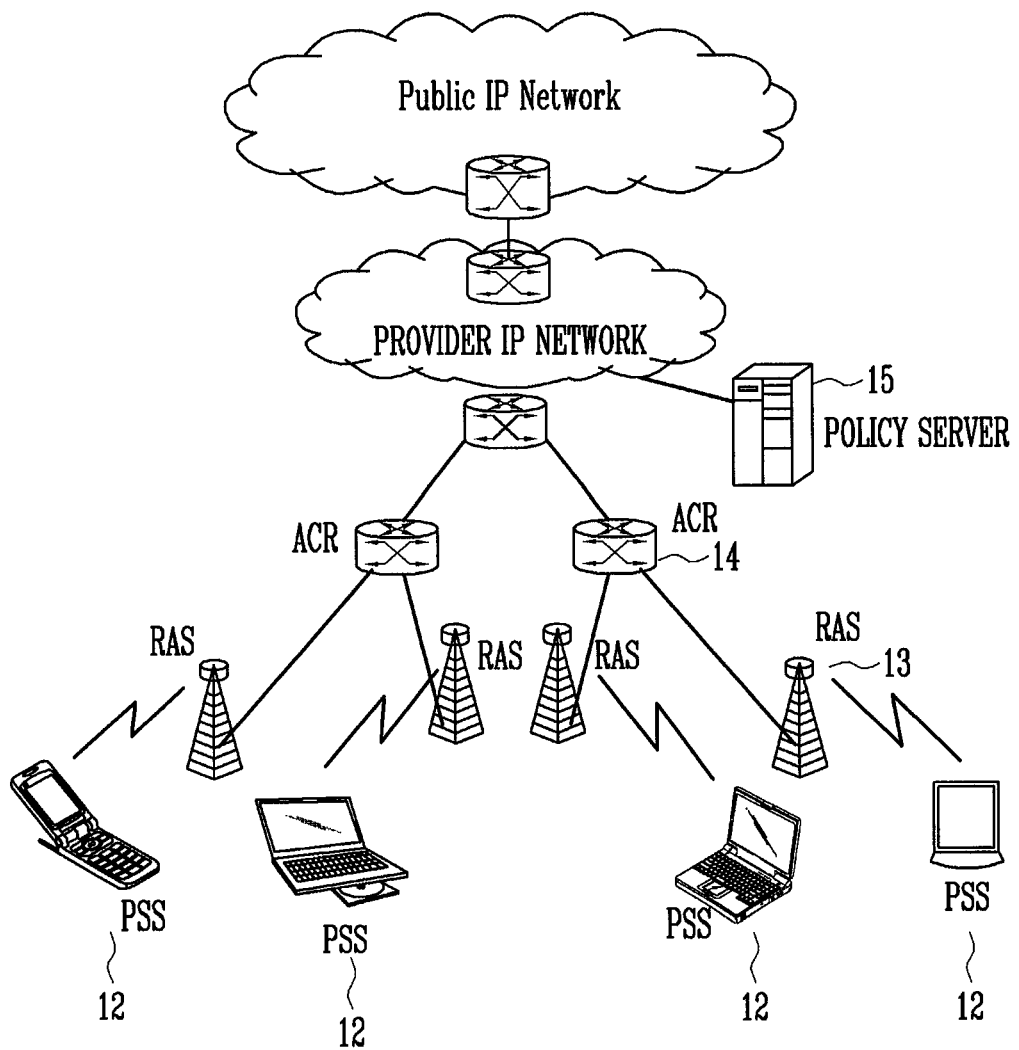
FIG. 1 illustrates the structure of a wireless portable Internet system in which a decoding apparatus of the present invention can be implemented.

10: Decoding apparatus
100: Channel estimating/compensating means
110: Channel estimating means
160: Channel compensating means
200: Demodulating/decoding means
240: Correlation metric generating means
250: Correlation metric buffer
260: Decoding processing means

DETAILED DESCRIPTION OF THE PREFERRED EMBODIMENTS

Hereinafter, exemplary embodiments of the present invention will be described in detail. However, the present invention is not limited to the exemplary embodiments disclosed below, but can be implemented in various forms. The exemplary embodiments are described so that this disclosure will enable those of ordinary skill in the art to which the invention pertains to embody and practice the invention.

For example, the spirit of the present invention can be applied to a decoding apparatus for data demodulation in a receiving end of a communication system that transmits data in a complex number signal form and, even when a received signal does not accurately agree with a determined pattern, estimates a channel using a value of the highest likelihood according to a predetermined algorithm. For convenience, the present invention is implemented in a decoding apparatus at a receiving end of a wireless portable Internet system radio access station (RAS) based on an Orthogonal Frequency Division Multiple Access (OFDMA) scheme in the following embodiments, but the invention is not limited to such implementation.

(Exemplary Embodiments)

The present exemplary embodiment is a wireless portable Internet system conforming to the Institute of Electrical and Electronics Engineers (IEEE) 802.16d standard or the IEEE 802.16e standard, to which the spirit of the present invention is applied. In particular, the wireless portable Internet system is implemented for transmission of a fast feedback signal. To be specific, subchannels for fast feedback signal transmission through which a 6-bit payload is transmitted by 48 subcarriers are considered in this exemplary embodiment. Each fast feedback subchannel consists of one OFDMA subchannel allocated to a portable subscriber station (PSS). Each OFDMA subchannel is mapped by a method similar to general uplink data mapping.

Figure 2:
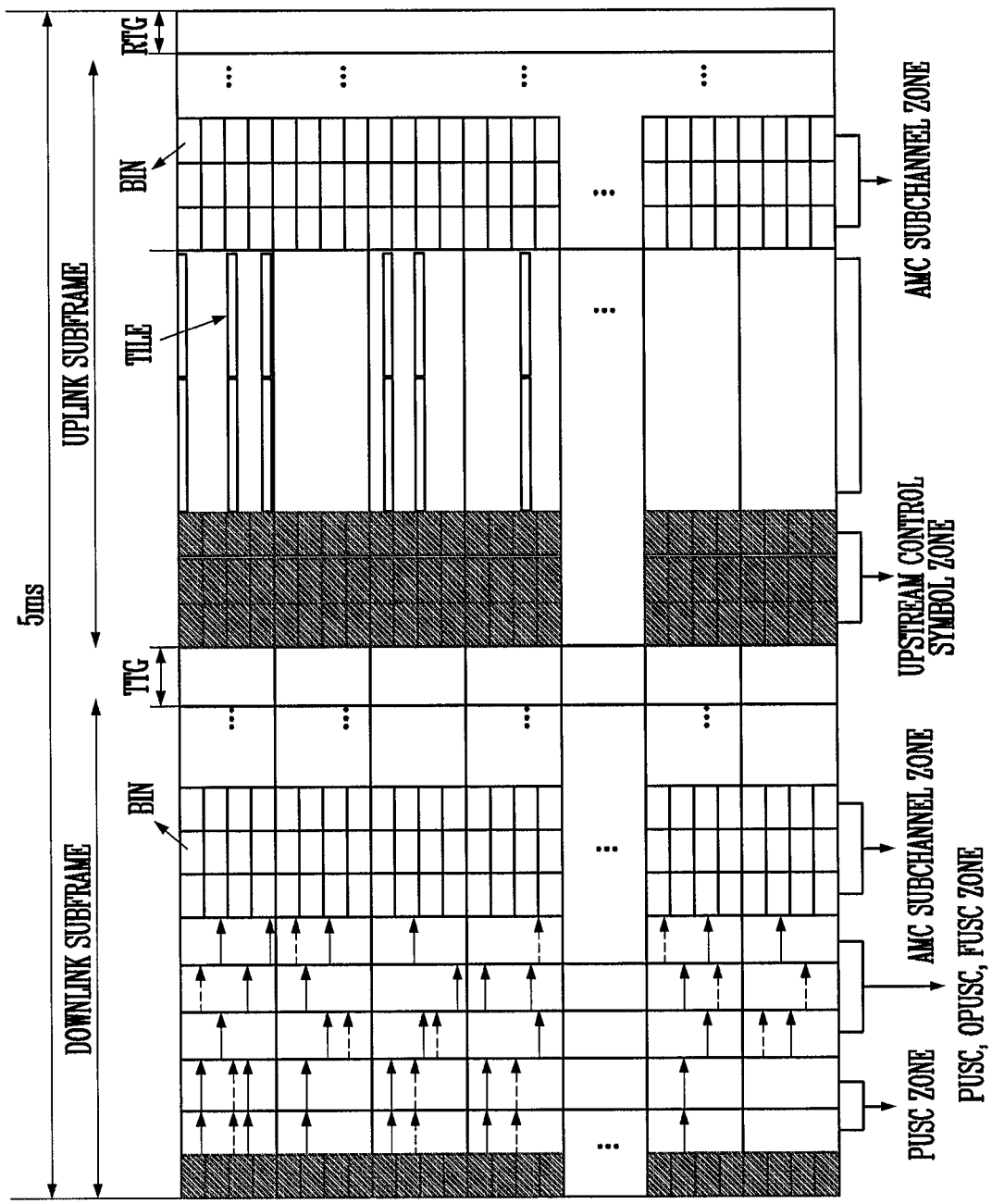
FIG. 2 is a timing diagram showing a structure of a data transmission frame of a wireless portable Internet system.

In the wireless portable Internet system employing the OFDMA scheme, all transmission frames on a wireless channel, through which data communication is performed between one RAS and a plurality of PSSs, have the structure shown in FIG. 2. The illustrated frame, to which a time division duplexing method (TDD) is applied for 5 ms, is divided into an uplink subframe containing data to be transmitted from the PSSs to the RAS and a downlink subframe containing data to be transmitted from the RAS to the PSSs.

According to the IEEE 802.16e standard and the IEEE 802.16d standard, a fast feedback signal and an ACK/NACK signal are transmitted by Quadrature phase shift keying (QPSK) modulation signals distributed to 48 subcarriers constituting a subchannel allocated to each PSS. Among the subchannels, a fast feedback subchannel uses QPSK modulation on 48 subcarriers and can transfer 6-bit fast feedback data. The 48 subcarriers may be obtained from 6 optional partial usage of subchannel (OPUSC) tiles or 6 partial usage subchannel (PUSC) tiles.

FIG. 2 illustrates a structure of an uplink/downlink frame of a wireless portable Internet system conforming to the standards. The illustrated frame is divided into an uplink subframe and a downlink subframe. The downlink subframe comprises a PUSC zone, a diversity subchannel zone, and an adaptive modulation and coding (AMC) subchannel zone, and the uplink subframe comprises an uplink control symbol zone, a diversity subchannel zone, and an AMC subchannel zone. Each zone is used to transmit data on each PSS or control signals and selected according to its usage.

In the frame of FIG. 2, tiles and bins are used as a transmission unit for dividing and transferring data. The tiles and bins are comprised of subcarriers corresponding to one period capable of carrying one phase signal. A bin is a data transmission unit consisting of subcarriers having 9 sequential frequencies at the same point of time, as illustrated in FIG. 3A, and uses a subcarrier having an intermediate frequency to transmit a pilot signal. The tiles may be OPUSC tiles and/or PUSC tiles. The OPUSC tile is comprised of 9 subcarriers defined by combinations of 3 frequency units and 3 time units, as illustrated in FIG. 3B, and uses one center subcarrier to transmit a pilot signal. The PUSC tile is comprised of 12 subcarriers defined by 4 frequency units and 3 time units, as illustrated in FIG. 3C, and uses 4 subcarriers at the angular points to transmit a pilot signal.

Among many kinds of signals transmitted to operate the wireless portable Internet, the fast feedback signal and the ACK/NACK signal can be transmitted by a QPSK modulation scheme according to this exemplary embodiment. The signals are payloads having a size of 1 bit, 3 bits, 4 bits, 5 bits or 6 bits according to a kind specified in the IEEE 802.16d standard, the IEEE 802.16e standard, or another standard. In the case of the fast feedback signal, the number of subcarriers of one PSS for carrying the payloads is specified to be 48 in the standards. In addition, in order to ensure 48 subcarriers, it is specified that one subchannel includes 6 tiles. In addition, in the case of a 1 bit ACK/NACK signal, the subchannel of one PSS for carrying the payload is specified to consist of 3 tiles in the standards.

Figure 4:
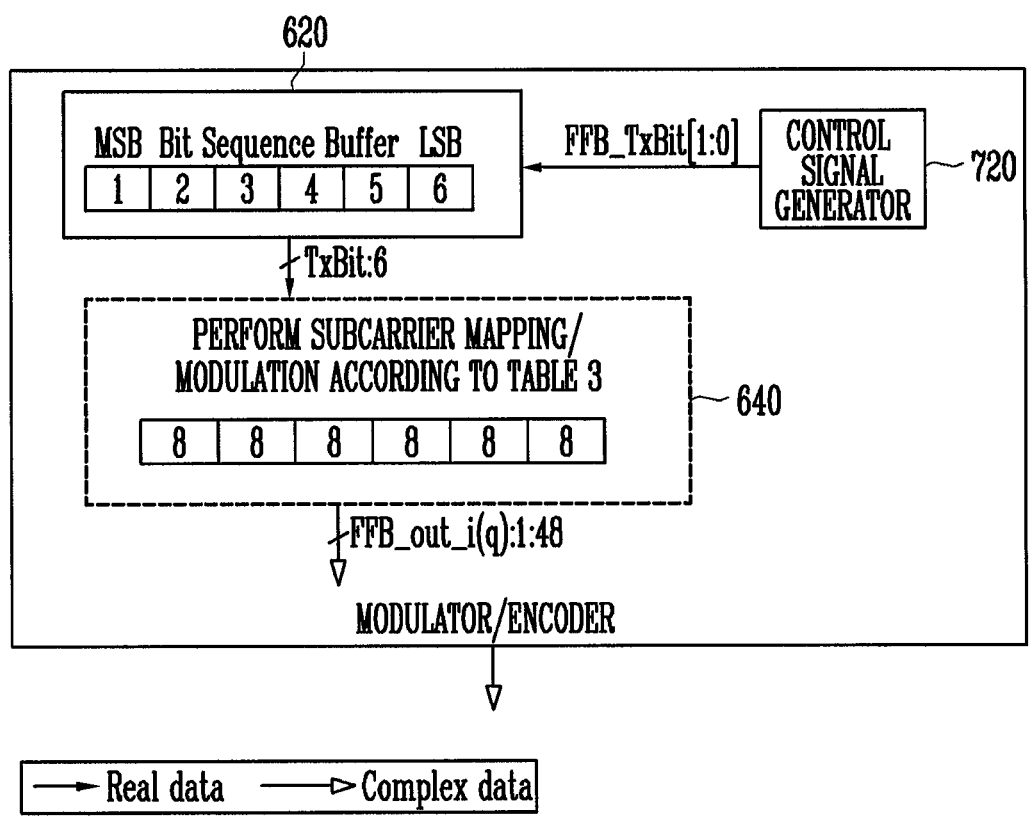
FIG. 4 is a block diagram showing a part of the constitution of an encoder corresponding to a decoding apparatus of the present invention.

FIG. 4 illustrates the structure of an encoder of a PSS constituting a wireless Internet system. The illustrated encoder comprises an input buffer 620 for receiving 6-bit data to be encoded, and a mapping block 640 for encoding the data latched in the input buffer 620 according to a predetermined algorithm. The 6-bit data is input from a control signal generator 720.

The input 6-bit value is symbol-mapped onto a row of 6 vector indexes capable of filling 6 tiles. Output values of a row of 6 vector indexes corresponding to each input 6-bit value are shown in Table 1 below. The index numbers "0" to "7" representing tile values in Table 1 are denoted by sets of vectors shown in Table 2 below. Each vector is denoted by 4 complex numbers having a phase difference of 90 degree, as shown in Formulae 1 below, and is physically applied to a subcarrier.

TABLE 1

| 6-bit payload | vector index row |
|---|---|
| 000000 | 0, 0, 0, 0, 0, 0 |
| 000001 | 1, 1, 1, 1, 1, 1 |
| 000010 | 2, 2, 2, 2, 2, 2 |
| 000011 | 3, 3, 3, 3, 3, 3 |
| 000100 | 4, 4, 4, 4, 4, 4 |
| 000101 | 5, 5, 5, 5, 5, 5 |
| 000110 | 6, 6, 6, 6, 6, 6 |
| 000111 | 7, 7, 7, 7, 7, 7 |
| 001000 | 2, 4, 3, 6, 7, 5 |
| 001001 | 3, 5, 2, 7, 6, 4 |
| 001010 | 0, 6, 1, 4, 5, 7 |
| 001011 | 1, 7, 0, 5, 4, 6 |
| 001100 | 6, 0, 7, 2, 3, 1 |
| 001101 | 7, 1, 6, 3, 2, 0 |
| 001110 | 4, 2, 5, 0, 1, 3 |
| 001111 | 5, 3, 4, 1, 0, 2 |
| 010000 | 4, 3, 6, 7, 5, 1 |
| 010001 | 5, 2, 7, 6, 4, 0 |
| 010010 | 6, 1, 4, 5, 7, 3 |
| 010011 | 7, 0, 5, 4, 6, 2 |
| 010100 | 0, 7, 2, 3, 1, 5 |
| 010101 | 1, 6, 3, 2, 0, 4 |
| 010110 | 2, 5, 0, 1, 3, 7 |
| 010111 | 3, 4, 1, 0, 2, 6 |
| 011000 | 3, 6, 7, 5, 1, 2 |
| 011001 | 2, 7, 6, 4, 0, 3 |
| 011010 | 1, 4, 5, 7, 3, 0 |
| 011011 | 0, 5, 4, 6, 2, 1 |
| 011100 | 7, 2, 3, 1, 5, 6 |
| 011101 | 6, 3, 2, 0, 4, 7 |
| 011110 | 5, 0, 1, 3, 7, 4 |
| 011111 | 4, 1, 0, 2, 6, 5 |
| 100000 | 6, 7, 5, 1, 2, 4 |
| 100001 | 7, 6, 4, 0, 3, 5 |
| 100010 | 4, 5, 7, 3, 0, 6 |
| 100011 | 5, 4, 6, 2, 1, 7 |
| 100100 | 2, 3, 1, 5, 6, 0 |
| 100101 | 3, 2, 0, 4, 7, 1 |
| 100110 | 0, 1, 3, 7, 4, 2 |
| 100111 | 1, 0, 2, 6, 5, 3 |
| 101000 | 7, 5, 1, 2, 4, 3 |
| 101001 | 6, 4, 0, 3, 5, 2 |
| 101010 | 5, 7, 3, 0, 6, 1 |
| 101011 | 4, 6, 2, 1, 7, 0 |
| 101100 | 3, 1, 5, 6, 0, 7 |
| 101101 | 2, 0, 4, 7, 1, 6 |
| 101110 | 1, 3, 7, 4, 2, 5 |
| 101111 | 0, 2, 6, 5, 3, 4 |
| 110000 | 5, 1, 2, 4, 3, 6 |
| 110001 | 4, 0, 3, 5, 2, 7 |
| 110010 | 7, 3, 0, 6, 1, 4 |
| 110011 | 6, 2, 1, 7, 0, 5 |
| 110100 | 1, 5, 6, 0, 7, 2 |
| 110101 | 0, 4, 7, 1, 6, 3 |
| 110110 | 3, 7, 4, 2, 5, 0 |
| 110111 | 2, 6, 5, 3, 4, 1 |
| 111000 | 1, 2, 4, 3, 6, 7 |
| 111001 | 0, 3, 5, 2, 7, 6 |
| 111010 | 3, 0, 6, 1, 4, 5 |
| 111011 | 2, 1, 7, 0, 5, 4 |
| 111100 | 5, 6, 0, 7, 2, 3 |
| 111101 | 4, 7, 1, 6, 3, 2 |
| 111110 | 7, 4, 2, 5, 0, 1 |
| 111111 | 6, 5, 3, 4, 1, 0 |

TABLE 2

| Vector index | Subcarrier modulated value |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |

TABLE 2-continued

| Vector index | Subcarrier modulated value |
|---|---|
| 6 | P0, P2, P0, P2, P2, P0, P2, P0 |
| 7 | P0, P2, P2, P0, P2, P0, P0, P2 |

Formulae 1

$$P0 = \exp\left(j \cdot \frac{\pi}{4}\right)$$

$$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right)$$

According to Tables 1 and 2, an input 6-bit value is converted into 6 tile values, each tile value consists of a set of 8 vectors, and each vector is carried by one subcarrier. Consequently, the input 6-bit value is carried by 48 subcarriers, i.e., 6*8=48. Table 3 below shows the relation in further detail.

TABLE 3

| 6-bit payload | 48 data subcarriers |
|---|---|
| 000000 | 1+i −1+i −1−i 1−i 1+i −1+i −1−i 1−i 1+i −1+i −1−i 1−i 1+i −1+i −1−i 1−i 1+i −1+i −1−i 1−i 1+i −1+i −1−i 1−i 1+i −1+i −1−i 1−i 1+i −1+i −1−i 1−i 1+i −1+i −1−i 1−i 1+i −1+i −1−i 1−i 1+i −1+i |
| 000001 | 1+i 1−i −1−i −1+i 1+i 1−i −1−i −1+i 1+i 1−i −1−i −1+i 1+i 1−i −i −1−i −1+i 1+i 1−i −1−i −1+i 1+i 1−i −1−i −1+i 1+i 1−i −1−i −1+i 1+i 1−i −1−i −1+i 1+i 1−i −1−i −1+i 1+i 1−i −1−i −1+i 1+i 1−i −1−i −1+i |
| 000010 | 1+i 1+i −1+i −1+i −1−i −1−i 1−i 1−i 1+i 1+i −1+i −1+i −1−i −1−i 1−i 1−i −1−i −1−i 1−i 1−i 1+i 1+i −1+i −1+i −1−i −1−i 1−i 1−i 1+i 1+i −1+i −1+i 1+i 1+i −1+i −1+i −1−i −1−i 1−i 1−i −1+i −1+i −1−i −1−i 1−i 1−i 1+i 1+i |
| 000011 | 1+i 1+i 1−i 1−i −1−i −1−i −1+i −1+i 1+i 1+i 1−i 1−i −1−i −1−i i −1+i −1+i 1+i 1+i 1−i 1−i −1−i −1−i −1+i −1+i 1+i 1+i 1−i 1−i −1−i −1−i −1+i −1+i 1+i 1+i 1−i 1−i −1−i −1−i −1+i −1+i 1+i 1+i 1−i 1−i −1−i −1−i −1+i |
| 000100 | 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i 1+i |
| 000101 | 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i 1+i −1−i |
| 000110 | 1+i −1−i 1+i −1−i −1−i 1+i −1−i 1+i 1+i −1−i 1+i −1−i −1−i 1+i −1−i 1+i 1+i −1−i 1+i −1−i −1−i 1+i −1−i 1+i 1+i −1−i 1+i −1−i −1−i 1+i −1−i 1+i 1+i −1−i 1+i −1−i −1−i 1+i −1−i 1+i 1+i −1−i 1+i −1−i −1−i 1+i −1−i 1+i |
| 000111 | 1+i −1−i −1−i 1+i −1−i 1+i 1+i −1−i 1+i −1−i −1−i 1+i −1−i 1+i 1+i −1−i 1+i −1−i −1−i 1+i −1−i 1+i 1+i −1−i 1+i −1−i −1−i 1+i −1−i 1+i 1+i −1−i 1+i −1−i −1−i 1+i −1−i 1+i 1+i −1−i 1+i −1−i −1−i 1+i −1−i 1+i 1+i −1−i |
| ... | ... |
| 111110 | 1+i −1−i −1−i 1+i −1−i 1+i 1+i −1−i 1+i 1+i −1+i 1+i i 1+i 1+i 1+i 1+i −1+i 1+i −1−i −1−i 1−i 1−i 1+i −1+i −1+i −1−i 1+i −1−i 1+i 1+i −1+i 1+i 1+i −1−i 1−i 1+i −1−i 1−i 1+i 1−i −1−i −1+i 1+i 1−i −1−i −1+i |
| 111111 | 1+i −1−i 1+i −1−i −1−i −1+i 1+i 1+i 1+i −1−i 1+i 1+i −1+i 1+i − 1−i 1+i −1−i 1+i 1+i −1−i 1−i 1−i |

A decoding method embodying the spirit of the present invention will be described now. The present invention is aimed at rapidly performing decoding and reducing unnecessary calculations in decoding. To this end, the state of a wireless channel is estimated using pilot signals before decoding, and a signal received through the wireless channel is compensated according to the estimation result, thereby performing decoding using a real value, i.e., a real part or an absolute value, of the signal represented by a complex number.

Figure 5:
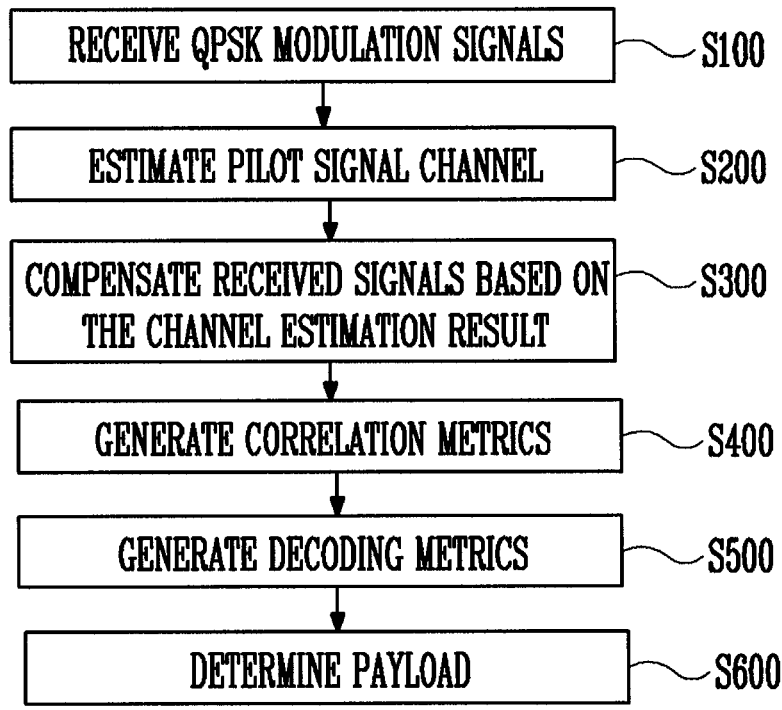
FIG. 5 is a flowchart showing a decoding method according to an exemplary embodiment of the present invention.

More specifically, as illustrated in FIG. 5, a decoding process according to this exemplary embodiment comprises the steps of: receiving QPSK modulated signals (step 100); compensating the signals by applying a channel estimation result based on pilot signals to the received signals (steps 200 and 300); performing subcarrier demodulation to generate correlation metrics on the basis of the compensated received signals (step 400); and performing decoding using a decoding metric derived from the correlation metrics (steps 500 and 600).

The channel estimation of a wireless channel in step 200 is performed not on an entire uplink section through which one RAS receives signals but on each subchannel established between one RAS and one PSS. Therefore, the channel estimation is performed by applying not an uplink control symbol zone signal but pilot signals included in respective tiles of a subchannel zone used for communication with a specific PSS.

Figure 3:
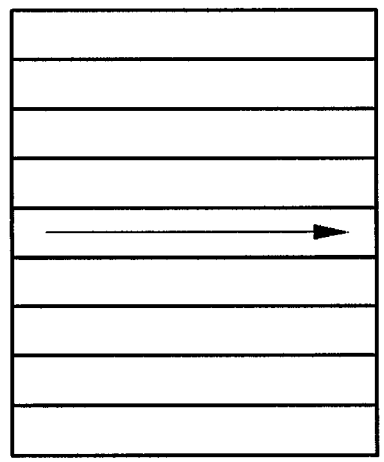
FIG. 3A illustrates a data structure of a bin.
FIG. 3B illustrates a data structure of an optional partial usage subchannel (OPUSC) tile.
FIG. 3C illustrates a data structure of a partial usage subchannel (PUSC) tile.
Figure 3:
Figure 3:
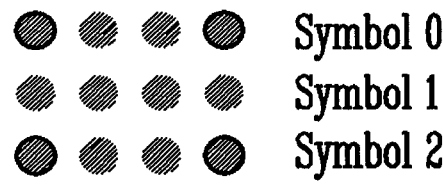

The pilot signal has a previously specified amplitude and phase, e.g., 0. The channel estimating means 110 of FIG. 3 compares the amplitude and phase of an actually received pilot signal with the previously specified amplitude and phase of a pilot signal, thereby recognizing the differences. A difference in amplitude denotes the amount of attenuation of the received signal, and a difference in phase denotes the amount of delay of the received signal. When the differences are applied to the received signal sharing a wireless channel with the pilot signal, an unit reference value determining the amplitude of a received signal may be adjusted according to the amount of attenuation, and a point of time at which the received signal is recognized may be adjusted.

Here, according to the wireless portable Internet standards, 6 tiles are allocated for fast feedback signal transmission of one PSS. Thus, the channel estimation and compensation process may be performed by applying the same compensation to the 6 tiles. However, the 6 tiles have no small difference in usable frequency and time slot. Therefore, it is preferable to apply a channel estimation result obtained using a pilot signal of each tile to subcarrier transmission signals of the same tile only, thereby separately performing channel estimation and compensation for the 6 tiles. Since a PUSC tile has 4 pilot signals, an average of channel estimation values obtained using the 4 pilot signals may be used for the wireless channel estimation.

As described above, a payload signal carried by 48 subcarriers included in 6 tiles are measured in a state in which the payload signal is compensated according to the channel estimation result based on the corresponding tile, and are buffered in an input buffer comprising 6 tile buffers, thereby completing step 300.

In another implementation obtaining only real values of compensated received signals for simple structure, the amplitude of a received signal may be recorded as a multiple of the unit reference value determined according to the attenuation.

Meanwhile, when demodulation/decoding is conventionally performed after step 300, a decoding table for 3072 subcarriers (64*48=3072) is necessary, which is a heavy burden on a processing apparatus performing decoding as well as a memory storing the table. According to the wireless portable Internet standards, it is specified that each of 8 phase signals is transmitted by each of 6 tiles, the 48 phase signals are classified into 6 subsets consisting of 8 phase signals, each subset denotes one vector index value, and a combination of a predetermined number of vector index values denotes one payload.

Therefore, this exemplary embodiment performs demodulation with a simple structure using the tile division structure according to the wireless portable Internet standards and an algorithm for generating predetermined vector indexes.

To this end, a correlation metric denoting likelihood between signals received in one tile and the respective vector indexes of Table 2 is obtained as intermediate data generated during the decoding process. One set of correlation metrics is generated from 6 tiles and 8 vector indexes. Here, the likelihood between real values of the tiles or bins and the vector indexes is referred to as index-likelihood, and likelihood between the correlation metrics and a value that may be a payload is referred to as payload-likelihood.

Here, the metrics correspond to all elements in a matrix, as shown in the drawings, and are values calculated to indicate likelihood.

There are two methods that apply the spirit of the present invention using real values of the received signals to the demodulation step 400, a method that the correlation metrics are composed of real values and a method that real values of the received signals are obtained and buffered, and the correlation metrics are generated using demodulation codes which are real values. Since the first method easily improves upon the conventional art, it will be described first in the context of the present exemplary embodiment.

In the case of the first method, a demodulation/decoding method of performing channel compensation after step 300 comprises the steps of: calculating inner products of a fundamental vector set consisting of 8 complex numbers in units of tiles or bins of the compensated received signals, and generating correlation metrics (step 400); generating decoding metrics from the correlation metrics and respective candidate payload values, which may be referred to as candidate decoding values because they are candidate values of a final decoding result (step 500); and determining a candidate value corresponding to the largest of the decoding metrics (step 600). Here, in step 500, the step of distinguishing a subset used to generate a decoding metric from the correlation metrics and a specific candidate payload value from components of the correlation metrics, and the step of summing up values of the distinguished subset and calculating a decoding metric for the candidate payload value are repeated for all candidate payload values, thereby generating the decoding metrics.

Next, the constitution of a decoding apparatus performing the decoding method of this exemplary embodiment will be described, and then a detailed process of generating correlation metrics in step 400 and a detailed process of generating decoding metrics in step 500 will be described in the context of the decoding apparatus having the described constitution.

Figure 6:
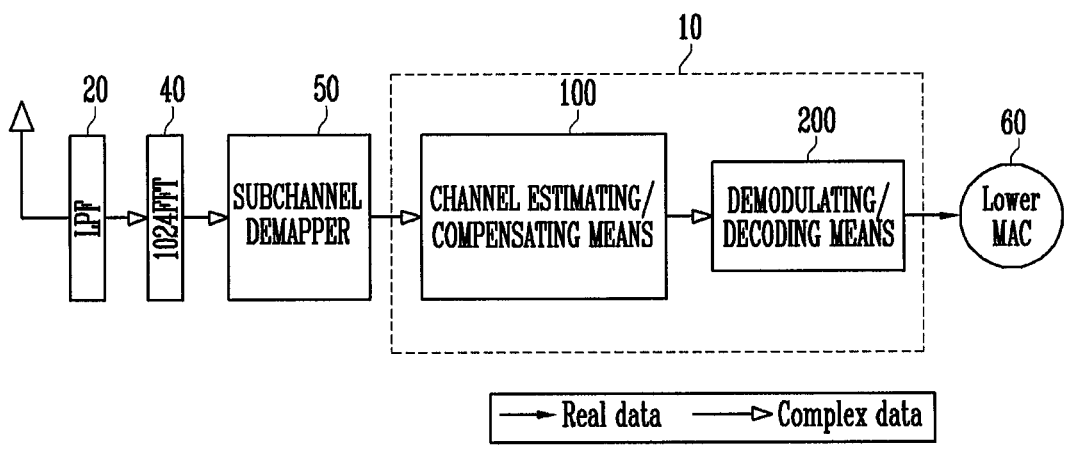
FIG. 6 is a block diagram showing a constitution of a receiving-end wireless core module of a portable Internet radio access station (RAS) in which a decoding apparatus of the present invention can be implemented.

FIG. 6 illustrates the structure of a wireless core module section before a lower media access control (MAC) layer of a RAS receiving means of a wireless portable Internet system. The portable Internet system uses a time division duplex (TDD) scheme dividing a downlink and an uplink by time and an OFDMA scheme as a multiple access method. Wireless signals based on the OFDMA scheme, which are carried by a plurality of subcarriers, are received by an antenna, passed through a low pass filter 20, and then converted from a time domain signal into a frequency domain signal by a fast Fourier transform (FFT) block 40. Here, the frequency domain signal includes a plurality of QPSK modulation signals. Subsequently, the converted signal is input to a decoding apparatus 10 according to this exemplary embodiment. Finally, a payload obtained by the decoding apparatus 10 is transferred to a MAC layer 60.

As illustrated in FIG. 6, the decoding apparatus of a system supporting the OFDMA scheme according to this exemplary embodiment for performing the decoding process is for estimating a payload carried by a plurality of received signals distributed to 6 tiles or bins. The decoding apparatus comprises a wireless channel estimating/compensating means 100 for estimating a pilot signal included in each tile or bin and compensating the received signals according to the estimating result, and a demodulating/decoding means 200 for decoding the compensated received signals of the complex number format and determining a payload.

Figure 7:
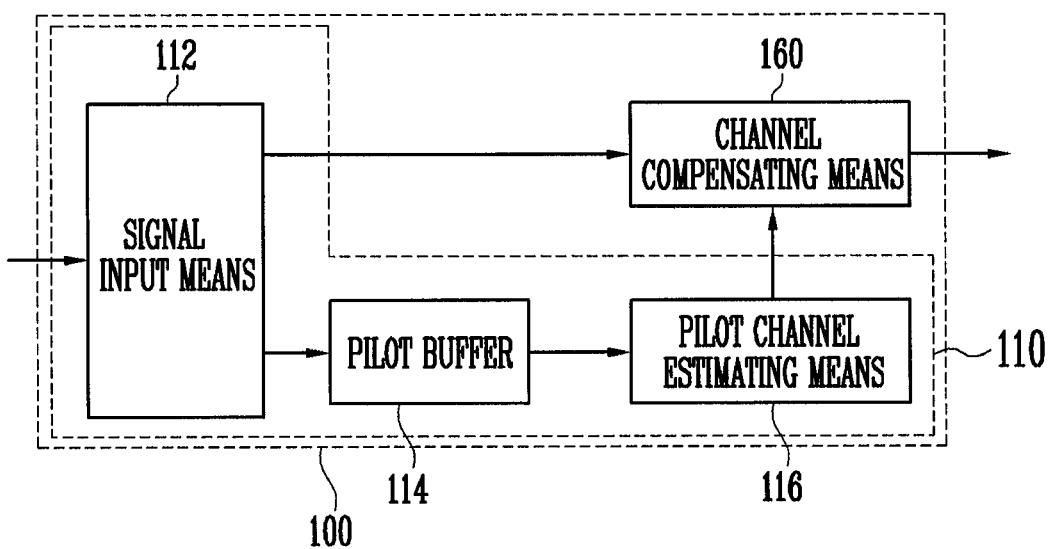
FIG. 7 is a block diagram of a channel estimating/compensating means of a decoding apparatus according to an exemplary embodiment of the present invention.

As illustrated in FIG. 7, the wireless channel estimating/compensating means 100 embodying the spirit of the present invention comprises a wireless channel estimating means 110 estimating a channel using the amount of attenuation and/or the delay time of pilot signals included in the tiles or bins, and a wireless channel compensating means 160 compensating the channel by applying the amount of attenuation to measuring the amplitude of a data signal included in the tile or bin, applying the delay time to measuring the phase of the data signal, etc.

The wireless channel estimating means 110 may be implemented by a signal input end 112 for receiving received signals, a pilot buffer 114 for obtaining a pilot signal among the received signals input to the signal input end 112, and a pilot channel estimating means 116 for estimating a channel using change in amplitude and phase of the pilot signal buffered in the pilot buffer 114. In this case, the received signals except the pilot signal input to the signal input end 112 are input to the channel compensating means 160, and the channel compensating means 160 compensates the received signals according to the channel estimation result of the pilot channel estimating means 116. Since the received signals are QPSK modulation signals recording data in their phases, the compensation for a delay time is particularly important in a process of compensating the received signals. A point of time of signal detection may be adjusted so that the delay time of the pilot signal becomes 0, thereby performing the compensation for a delay time. The compensation of the received signals is completed by recording compensated values in a receiving buffer 220 of FIG. 8 described below.

Figure 8:
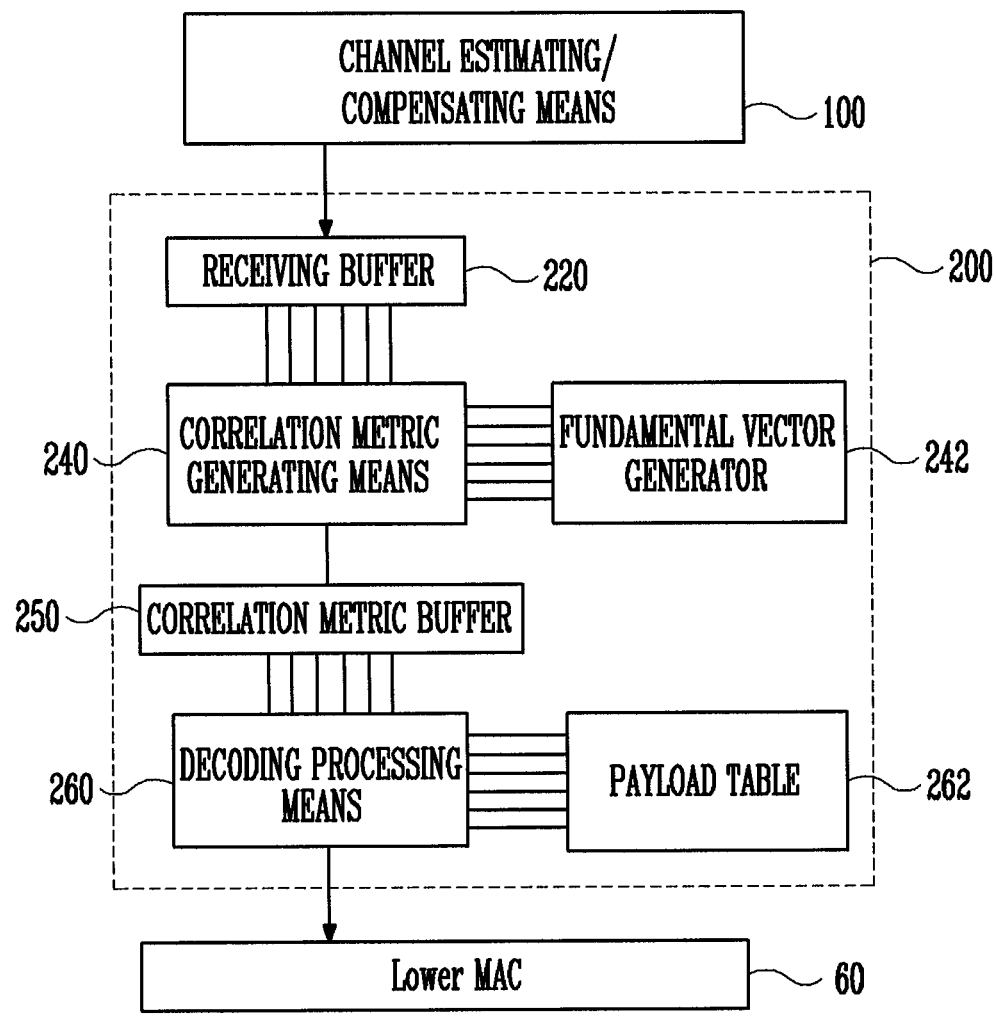
FIG. 8 is a block diagram of a demodulating/decoding means of a decoding apparatus according to an exemplary embodiment of the present invention.

As illustrated in FIG. 8, the demodulating/decoding means 200 embodying the spirit of the present invention comprises a receiving buffer 220 for buffering the QPSK modulation signals compensated by the channel estimating/compensating means 100, a correlation metric generating means 240 for generating correlation metrics using the received signals buffered in the receiving buffer 220, and a decoding processing means 260 for performing decoding using a decoding metric derived from the correlation metrics.

The receiving buffer 220 may include a plurality of tile buffers for buffering received signals according to tiles constituting a subchannel. In an exemplary embodiment according to the portable Internet standards, the receiving buffer 220 includes 6 tile buffers.

The decoding processing means 260 may include a decoding metric generating means for summing up a subset of the correlation metrics designated for each candidate payload value to generate decoding metrics, and a payload determining means for determining a payload using a metric having the largest value among the decoding metrics.

In some embodiments, the demodulating/decoding means 200 may further comprise a correlation metric buffer 250 for storing the correlation metrics. In addition, the receiving buffer 220 is shown as a component included in the demodulating/decoding means 200 in FIG. 8, but from another point of view may be seen as a separate component from the demodulating/decoding means 200.

A decoding process performed by the demodulating/decoding means 200 of the decoding apparatus of this exemplary embodiment will be described in detail with reference to FIGS. 8 and 9. Received signals, each of which has one of 4 values of Formulae 1, carried by 48 subcarriers are referred to as received signal Nos. 0 to 47 in order of the corresponding subcarriers.

Figure 9:
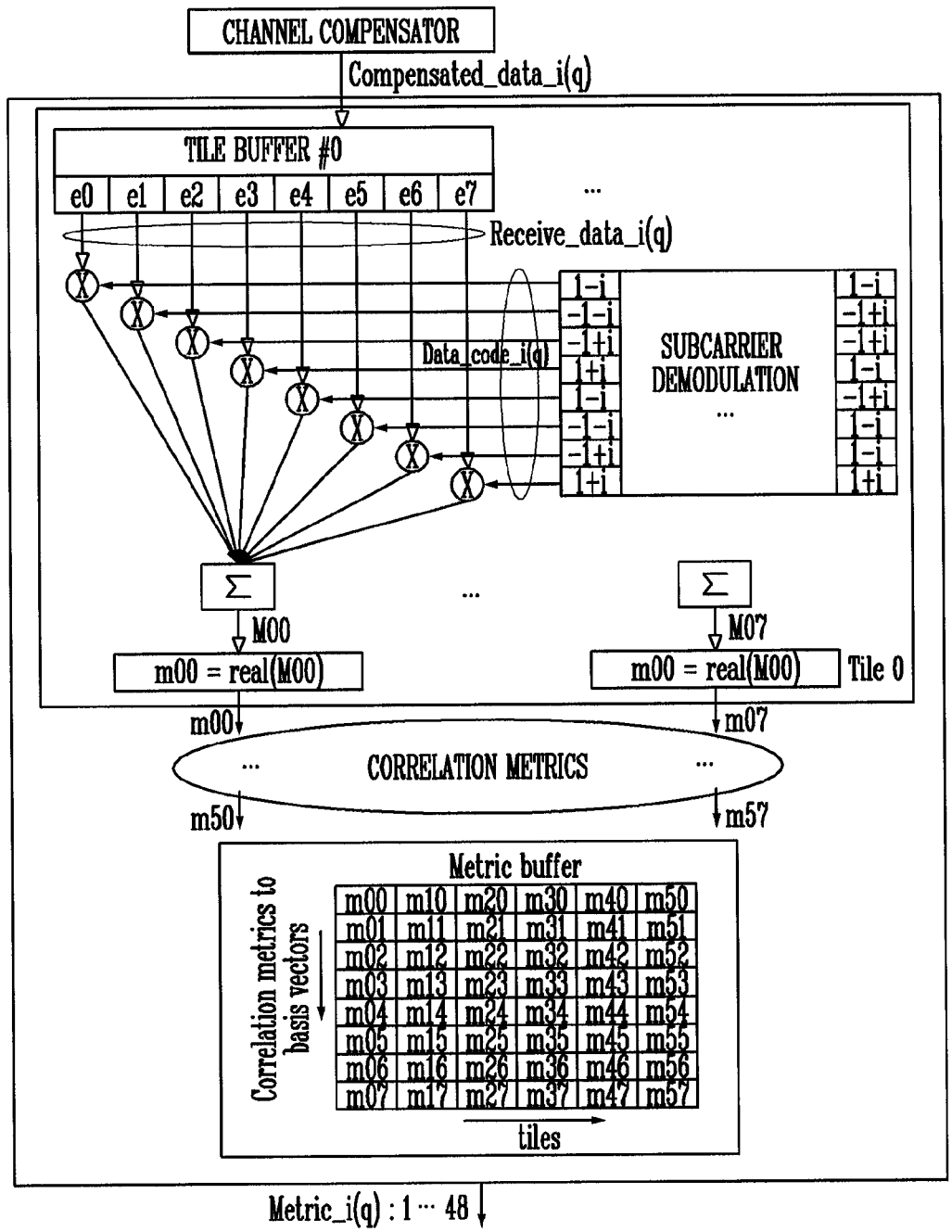
FIG. 9 is a conceptual diagram illustrating a correlation metric generation process of a decoding apparatus of the present invention.

Received signal Nos. 0 to 7 among the 48 received signals are stored in a tile buffer #0, i.e., a buffer for tile 0, illustrated in FIG. 9. Received signal Nos. 8 to 15 are stored in a buffer for tile 1, and received signal Nos. 16 to 23 are stored in a buffer for tile 2. The process is repeated in the same way, and received signals Nos. 40 to 47 are stored in a final buffer for tile 5.

Decoding according to the present invention involves first performing demodulation, i.e., first decoding, on 8 values stored in each tile buffer to generate correlation metrics, and then performing second decoding, i.e., correlation decoding, using the correlation metrics. For convenience in describing processes of generating and using the metrics, correlation metrics are arranged in the form of a 6*8 matrix in FIG. 9. There are 6 tile buffers from tile buffer #0 to tile buffer #5, and FIG. 9 illustrates a process of demodulating tile in the buffer #0.

A fundamental vector generator 242 may include a demodulation table in which patterns of 8 fundamental vectors are recorded, and reads the pattern information of the fundamental vectors and generates fundamental vector signals required for performing demodulation. Here, the fundamental vectors denote values of 0 to 7, respectively.

As illustrated in FIG. 9, the correlation metric generating means 240 calculates inner products of the values buffered in tile buffer #0 and the fundamental vector signals, and then sums them up to generate a correlation metric. Since the correlation metric generation process is performed once per combination of a value recorded in tile buffer #0 and each of the 8 fundamental vectors of the fundamental vector generator 242, a total of 8 correlation metrics are generated as the result of the process. In FIG. 9, a result value obtained by applying a first column of the demodulation table of the fundamental vector generator 242 is m00, and a result value obtained by applying an eighth (last) column is m07. Eight result values m00 to m07 are stored in a first column of the correlation metric buffer 250.

In the same way, 8 result values m10 to m17 obtained by demodulating values recorded in tile buffer #1 are stored in a second column of the correlation metric buffer 250. This process is repeated until tile buffer #5 is processed, and 8 result values m50 to m57 obtained by demodulating values recorded in last tile buffer #5 are stored in a sixth column of the correlation metric buffer 250.

Each metric constituting the illustrated correlation metrics generated and recorded in the correlation metric buffer 250 as described above denotes a probability of a vector index being an order of a row in each tile denoted by an order of a column. For example, m02 among the correlation metrics of FIG. 9 denotes an index-likelihood corresponding to a probability of a signal carried by tile No. 0 indicating vector No. 2, and m25 denotes an index-likelihood corresponding to a probability of a signal carried by tile No. 2 indicating vector No. 5. In the process of generating the correlation metrics, a vector index having the largest index-likelihood is not determined, but index-likelihoods based on 8 vector indexes are recorded in the correlation metrics. This enables accurate estimation of a signal from all 48 real values by the following process of calculating a decoding metric, even when more signal distortions occur.

The decoding metric generating means calculates a payload-likelihood of the final decoding value being a specific payload using values recorded in the correlation metrics. The calculated payload-likelihood is recorded as a decoding metric, and decoding metrics may be generated by calculating payload-likelihoods of respective candidate payload value Nos. 0 to 63 based on received signals of the 6 tiles. During the process of generating the decoding metrics, a payload table including the relation of Table 1 may be used.

The payload table, in which vector indexes for the respective candidate payload values are recorded, may be implemented by recording a row of vector indexes in the case of a payload being 0 in a first row, a row of vector indexes in the case of a payload being 1 in a second row, and so on. Therefore, the payload table has 64 rows when a 6-bit payload is carried, and 16 rows when a 4-bit payload is carried. Table 4 below is an exemplary embodiment of a payload table for a 6-bit payload.

TABLE 4

| | | | | | |
|---|---|---|---|---|---|
| 0 | 0 | 0 | 0 | 0 | 0 |
| 1 | 1 | 1 | 1 | 1 | 1 |
| 2 | 2 | 2 | 2 | 2 | 2 |
| 3 | 3 | 3 | 3 | 3 | 3 |
| 4 | 4 | 4 | 4 | 4 | 4 |
| 5 | 5 | 5 | 5 | 5 | 5 |
| 6 | 6 | 6 | 6 | 6 | 6 |
| 7 | 7 | 7 | 7 | 7 | 7 |
| 2 | 4 | 3 | 6 | 7 | 5 |
| 3 | 5 | 2 | 7 | 6 | 4 |
| 0 | 6 | 1 | 4 | 5 | 7 |
| 1 | 7 | 0 | 5 | 4 | 6 |
| 6 | 0 | 7 | 2 | 3 | 1 |
| 7 | 1 | 6 | 3 | 2 | 0 |
| 4 | 2 | 5 | 0 | 1 | 3 |
| 5 | 3 | 4 | 1 | 0 | 2 |
| 4 | 3 | 6 | 7 | 5 | 1 |
| 5 | 2 | 7 | 6 | 4 | 0 |
| 6 | 1 | 4 | 5 | 7 | 3 |
| 7 | 0 | 5 | 4 | 6 | 2 |
| 0 | 7 | 2 | 3 | 1 | 5 |
| 1 | 6 | 3 | 2 | 0 | 4 |
| 2 | 5 | 0 | 1 | 3 | 7 |
| 3 | 4 | 1 | 0 | 2 | 6 |
| 3 | 6 | 7 | 5 | 1 | 2 |
| 2 | 7 | 6 | 4 | 0 | 3 |
| 1 | 4 | 5 | 7 | 3 | 0 |
| 0 | 5 | 4 | 6 | 2 | 1 |
| 7 | 2 | 3 | 1 | 5 | 6 |
| 6 | 3 | 2 | 0 | 4 | 7 |
| 5 | 0 | 1 | 3 | 7 | 4 |
| 4 | 1 | 0 | 2 | 6 | 5 |
| 6 | 7 | 5 | 1 | 2 | 4 |
| 7 | 6 | 4 | 0 | 3 | 5 |
| 4 | 5 | 7 | 3 | 0 | 6 |
| 5 | 4 | 6 | 2 | 1 | 7 |

TABLE 4-continued

| | | | | | |
|---|---|---|---|---|---|
| 2 | 3 | 1 | 5 | 6 | 0 |
| 3 | 2 | 0 | 4 | 7 | 1 |
| 0 | 1 | 3 | 7 | 4 | 2 |
| 1 | 0 | 2 | 6 | 5 | 3 |
| 7 | 5 | 1 | 2 | 4 | 3 |
| 6 | 4 | 0 | 3 | 5 | 2 |
| 5 | 7 | 3 | 0 | 6 | 1 |
| 4 | 6 | 2 | 1 | 7 | 0 |
| 3 | 1 | 5 | 6 | 0 | 7 |
| 2 | 0 | 4 | 7 | 1 | 6 |
| 1 | 3 | 7 | 4 | 2 | 5 |
| 0 | 2 | 6 | 5 | 3 | 4 |
| 5 | 1 | 2 | 4 | 3 | 6 |
| 4 | 0 | 3 | 5 | 2 | 7 |
| 7 | 3 | 0 | 6 | 1 | 4 |
| 6 | 2 | 1 | 7 | 0 | 5 |
| 1 | 5 | 6 | 0 | 7 | 2 |
| 0 | 4 | 7 | 1 | 6 | 3 |
| 3 | 7 | 4 | 2 | 5 | 0 |
| 2 | 6 | 5 | 3 | 4 | 1 |
| 1 | 2 | 4 | 3 | 6 | 7 |
| 0 | 3 | 5 | 2 | 7 | 6 |
| 3 | 0 | 6 | 1 | 4 | 5 |
| 2 | 1 | 7 | 0 | 5 | 4 |
| 5 | 6 | 0 | 7 | 2 | 3 |
| 4 | 7 | 1 | 6 | 3 | 2 |
| 7 | 4 | 2 | 5 | 0 | 1 |
| 6 | 5 | 3 | 4 | 1 | 0 |

In the Table 4, the decoding metric generating means calculates a payload-likelihood of a value recorded in the correlation metrics being 0, a payload-likelihood of a value recorded in the correlation metrics being 1, . . . , and a payload-likelihood of a value recorded in the correlation metrics being 63, thereby generating the decoding metrics.

The process of generating the decoding metrics will be described in detail now. The values constituting one row of the payload table of Table 4 are read and then the components of the correlation metrics in Table 5 below, are selected by a row order of the respective value and a column order of the respective value.

When a total of 6 components are selected from the correlation metrics, they are summed up, and a payload-likelihood of a payload value denoted by the read row is calculated. For example, when a first row of the payload table is applied, values corresponding to m00, m10, m20, m30, m40 and m50 among the components of the correlation metrics of Table 5 are summed up, and when a ninth row of the payload table is applied, values corresponding to m02, m14, m23, m36, m47 and m55 are summed up.

TABLE 5

| m00 | m10 | m20 | m30 | m40 | m50 |
|---|---|---|---|---|---|
| m01 | m11 | m21 | m31 | m41 | m51 |
| m02 | m12 | m22 | m32 | m42 | m52 |
| m03 | m13 | m23 | m33 | m43 | m53 |
| m04 | m14 | m24 | m34 | m44 | m54 |
| m05 | m15 | m25 | m35 | m45 | m55 |
| m06 | m16 | m26 | m36 | m46 | m56 |
| m07 | m17 | m27 | m37 | m47 | m57 |

Subsequently, the payload determiner selects the largest of the decoding metrics consisting of 64 payload-likelihoods calculated for 64 rows of the payload table and determines the order of the selected decoding metric as a final payload incorporated in the correlation metrics.

Meanwhile, the exemplary embodiment is implemented for transmitting a 6 bit fast feedback signal, but the spirit of the present invention may be embodied for transmitting a 4-bit fast feedback signal or a 1-bit ACK/NACK signal. Output values of a row of 6 vector indexes for a 4-bit fast feedback signal according to the standards are shown in Table 6 below, and output values of a row of 3 vector indexes for a 1-bit ACK/NACK signal according to the standards are shown in Table 7 below. Signals of Tables 6 and 7 have a simpler structure than that described above in the exemplary embodiment and can be easily derived from the above description.

TABLE 6

| 4 bit payload | Fast Feedback vector indices per Tile Tile(0), Tile(1), . . . Tile(5) |
|---|---|
| 0b0000 | 0, 0, 0, 0, 0, 0 |
| 0b0001 | 1, 1, 1, 1, 1, 1 |
| 0b0010 | 2, 2, 2, 2, 2, 2 |
| 0b0011 | 3, 3, 3, 3, 3, 3 |
| 0b0100 | 4, 4, 4, 4, 4, 4 |
| 0b0101 | 5, 5, 5, 5, 5, 5 |
| 0b0110 | 6, 6, 6, 6, 6, 6 |
| 0b0111 | 7, 7, 7, 7, 7, 7 |
| 0b1000 | 0, 1, 2, 3, 4, 5 |
| 0b1001 | 1, 2, 3, 4, 5, 6 |
| 0b1010 | 2, 3, 4, 5, 6, 7 |
| 0b1011 | 3, 4, 5, 6, 7, 0 |
| 0b1100 | 4, 5, 6, 7, 0, 1 |
| 0b1101 | 5, 6, 7, 0, 1, 2 |
| 0b1110 | 6, 7, 0, 1, 2, 3 |
| 0b1111 | 7, , 0, 1, 2, 3, 4 |

TABLE 7

| ACK 1-bit symbol | Vector Indices per Tile Tile(0), Tile(1), Tile(2) |
|---|---|
| 0 | 0, 0, 0 |
| 1 | 4, 7, 2 |

While the invention has been shown and described with reference to certain exemplary embodiments thereof, it will be understood by those skilled in the art that various changes in form and details may be made therein without departing from the spirit and scope of the invention as defined by the appended claims.

For example, while the spirit of the present invention is applied to tiles used for transmission of a control signal in the above-described exemplary embodiments, it may also be applied to a wireless channel such as bins, etc., used for transmission of a data signal.

The invention claimed is:

1. A decoding method for a wireless communication system, the method comprising the steps of:
    receiving signals;
    compensating the received signals by applying a result of channel estimation based on pilot signals to the received signals;
    obtaining an absolute value of the compensated received signals;
    calculating the inner products of the obtained absolute value and fundamental vector signals and summing the calculated inner products up to generate a correlation metric;
    wherein each the correlation metric uses a probability of a vector index being an order of a row in each tile or bins denoted by an order of a column;
    generating correlation metrics corresponding to each of the fundamental vector signals;
    wherein the correlation metrics denote probabilities of a relationship between fundamental vectors and tiles or bins of the obtained absolute value;

generating a decoding metric for each candidate payload value using the correlation metrics, wherein the decoding metric is obtained by calculating a payload-likelihood which is probability of a final decoding value being a specific payload using the correlation metrics; and determining a payload of the received signal, the payload being a candidate payload value having a largest value of the decoding metrics; wherein an amplitude of the received signal is recorded as a multiple of unit reference value which is determined according to an amount of attenuation of the received signal.

2. The decoding method of claim 1, wherein the correlation metrics are generated by calculating inner products of a set of 8 of said fundamental vectors in units of said tiles or bins of the compensated received signals.

3. The decoding method as in claim 1 or 2, further comprising the step of obtaining real values of the respective correlation metrics.

4. The decoding method as in claim 1 or 2, further comprising the step of obtaining real values of the compensated received signals.

5. The decoding method as in claim 1 or 2, wherein the received signal includes a feedback message or an acknowledgement message.

6. The decoding method of claim 1 or 2, wherein the step of generating a decoding metric for each candidate payload value comprises the step of:
   (a) distinguishing a subset from components of the correlation metrics using vector indexes for each candidate payload value recorded in payload table; and
   (b) generating decoding metrics by summing up values of the distinguished subset for each candidate payload value.

7. A decoding apparatus for a wireless communication system, the apparatus comprising:
   a wireless channel estimating/compensating means for compensating received signals and for obtaining an absolute value of the compensated received signals, according to a channel estimation result based on pilot signals;
   a correlation metric generating means for generating a correlation metric by calculating inner products of the obtained absolute value and fundamental vector signals and summing the calculated inner products up;
   wherein each correlation metric uses a probability of a vector index being an order of a row in each tile or bins denoted by an order of a column,
   generating correlation metrics corresponding to each of the fundamental vector signals;
   wherein the correlation metrics denote probabilities of a relationship between fundamental vectors and tiles or bins of the obtained absolute value;
   a decoding metric generating means for generating calculating a payload-likelihood which is probability of a final decoding value being a specific payload using the correlation metrics; and
   a decoding determining means for determining a payload of the received signal, the payload being a candidate payload value having a largest value of the decoding metrics,
   wherein an amplitude of the received signal is recorded as a multiple of unit reference value which is determined according to the amount of attenuation of the received signal.

8. The decoding apparatus of claim 7, wherein the correlation metrics are generated by calculating inner products of a set of 8 of said fundamental vectors in said tiles or bins of the compensated received signals.

9. The decoding apparatus as in claim 7 or 8, wherein the decoding processing means generates the decoding metric using real part values of the correlation metrics.

10. The decoding apparatus as in claim 7 or 8, wherein the correlation metric generating means generates the correlation metrics using real values of the compensated received signals.

11. The decoding apparatus as in claim 7 or 8, further comprising:
   a correlation metric buffer for storing the correlation metrics.

12. The decoding apparatus as in claim 7 or 8, further comprising:
   a fundamental vector generator for generating fundamental vectors required for calculating a correlation metric based on the compensated received signals.

13. The decoding apparatus as in claim 7 or 8, wherein the decoding processing means comprises:
   a payload table in which orders of rows are the candidate payload value, and a subset of the correlation metrics used for calculating a decoding metric on the basis of each candidate payload value is recorded in each row.

14. The decoding apparatus as in claim 7 or 8, wherein the received signals to which modulation is applied include a feedback message or an acknowledgment message.

15. The decoding apparatus as in claim 7 or 8, further comprising:
   a receiving buffer for buffering the compensated received signals.

* * * * *